United States Patent [19]

Murray

[11] 4,099,033
[45] Jul. 4, 1978

[54] TELEPHONE SECURITY DEVICE

[76] Inventor: Leonard Quintin Murray, 20, Holland Park, London, W.11, United Kingdom

[21] Appl. No.: 742,090

[22] Filed: Nov. 16, 1976

[30] Foreign Application Priority Data

Nov. 17, 1975 [GB] United Kingdom ............... 47353/75

[51] Int. Cl.² ............................................. H04M 1/66
[52] U.S. Cl. .............................. 179/90 D; 179/18 DA
[58] Field of Search ............ 179/18 DA, 90 D, 6.3 R, 179/18 B, 18 D, 189 D, 81 R, 27 CB

[56] References Cited

U.S. PATENT DOCUMENTS

| 3,553,382 | 1/1971 | Knox et al. ..................... 179/18 DA |
| 3,692,951 | 9/1972 | Hestad et al. ................... 179/18 DA |
| 3,872,260 | 3/1975 | Oatis ................................ 179/18 DA |
| 3,873,781 | 3/1975 | Nissim ................................. 179/18 B |
| 4,045,619 | 8/1977 | Harrington ..................... 179/18 DA |

Primary Examiner—Kathleen H. Claffy
Assistant Examiner—Gerald L. Brigance
Attorney, Agent, or Firm—Armstrong, Nikaido, Marmelstein & Kubovcik

[57] ABSTRACT

A telephone security device for preventing unauthorized use of a telephone subscriber's set comprises an inhibit device for rendering at least partly inoperative the called number selecting means of the set, and a code responsive control means for controlling the inhibit device in dependence upon predetermined code signals applied thereto by the authorized user(s) via the called number selecting means or via a separate keyboard. An emergency service number is obtainable at any time even when other calls are inhibited. Additional predetermined code signals are required to return the inhibit device to an inhibit mode.

10 Claims, 6 Drawing Figures

TELEPHONE SECURITY DEVICE

INTRODUCTION

This invention relates to telephone security devices for preventing unauthorised use of a telephone subscriber's set.

Various telephone security devices have been proposed which generally comprise an inhibiting circuit and a switch, for example a key switch or a switch in a hidden position, for bringing the inhibiting circuit into operation. When in operation, the inhibiting circuit may block all calls attempted or may block calls containing predetermined digits at predetermined positions corresponding to digits which are used to obtain nonlocal calls. There are also known devices which, by mechanical means, enable particular telephone numbers, for example to call the operator or to call an emergency services number (999 in the United Kingdom), to be obtained free.

The need for a key switch or a hidden switch can be inconvenient and accordingly it is an object of the present invention to provide a telephone security device for preventing unauthorised use of a telephone subscriber's set wherein no such switch is needed to control whether or not the device is in its inhibit state. It is a further object to provide a device which even when it is in its inhibit state, nevertheless enables at least one particular number, for example an emergency number, to be called.

BRIEF DESCRIPTION

According to the invention there is provided a telephone security device for preventing unauthorised use of a telephone subscriber's set, the device comprising inhibit means for connection to the called number selecting means of the set for at least partly inhibiting the operation of said selecting means, and code responsive control means which is connected to said inhibit means and which is operable for responding to the application thereto of a predetermined code signal to control said inhibit means to cause it to cease inhibiting the operation of said selecting means.

DESCRIPTION OF THE DRAWINGS

The above and further objects and various advantages of the invention will become apparent from the following description of embodiments of the invention taken in conjunction with the accompanying drawings, wherein.

Figure 1:
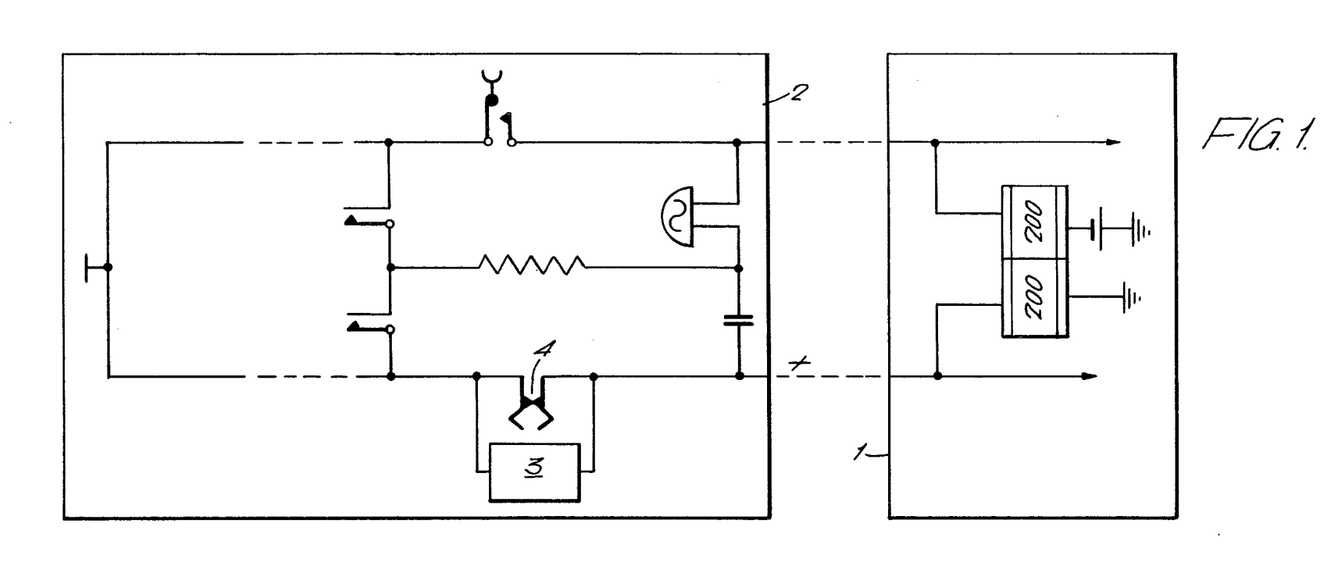
FIG. 1 is a simplified circuit diagram of a telephone subscriber's set showing how a first embodiment of a security device according to the invention may be connected thereto.

The portion of the telephone circuit shown in FIG. 1 comprises part of an automatic telephone exchange 1 and that part of a conventional subscribers telephone instrument 2 for producing break impulses. The construction and operation of such a telephone circuit is well known to those skilled in the art of telephony and will not be further described.

The device for preventing unauthorised telephone calls is denoted by reference numeral 3. It is connected across the dial impulse springs 4 of the telephone instrument.

Figure 2:
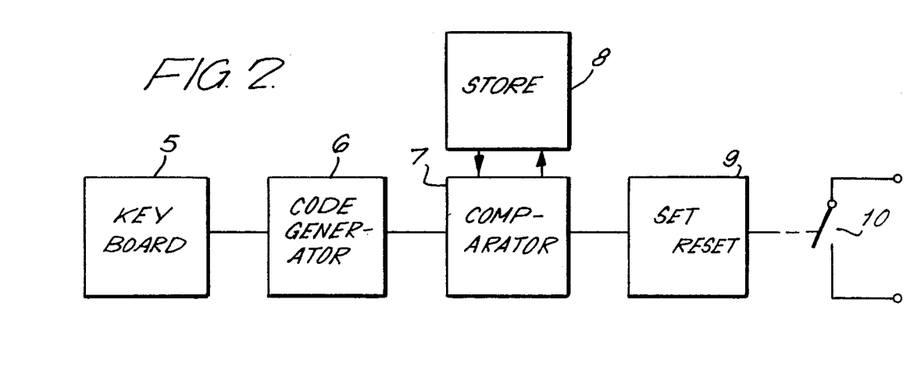
FIG. 2 is a simplified circuit diagram of the said first embodiment.

Referring to FIG. 2, the device comprises a keyboard 5, a code generator 6, a comparator 7, a store 8, a control circuit 9, and a controllable switch 10. The switch 10 is connected in parallel with the impulse springs 4.

The operation of the device is as follows:

Let it be assumed that the device has been set to prevent an unauthorised person from making a telephone call. In such a case the switch 10 short-circuits the dial impulse springs 4. In order for an authorised user to make a call, he enters a predetermined code on the keyboard. The code generator 6 produces an electrical coded signal, representing the code. The code as represented by the signal is compared in the comparator 7 with a code stored in the store 8 and if the code entered on the keyboard corresponds with the stored code the control circuit 9 is actuated and the switch 10 is opened, the authorised user is then able to make a call in the usual manner, and to continue to make calls until the short circuit is restored.

In order to restore the short circuit, any code other than the predetermined code is entered on the kayboard.

If, then a code other than the predetermined code is entered on the keyboard, the comparator will fail to find correspondence between the entered code and the stored code and the switch will not be opened.

There may be stored in the store more than one predetermined code so that, for example, different authorised users, to each of whom a different code is allotted, may make calls.

The device does not prevent calls from being received because the dialling impulse springs complete the receiving circuit whether the switch 10 is open or closed.

The device may be fitted within the housing of the telephone or may be provided in a separate housing externally of the telephone instrument. In the case of a separate housing two conductors will lead from the housing to the telephone instrument, the point of entry being at the telephone instrument's junction box. The device could be powered by d.c. current from a telephone exchange. Alternatively a small battery may be provided.

An on/off switch for the device may be provided in an inconspicuous position.

As an alternative to the above described device in which the required code to switch in the short circuit is fed to a store and comparator arrangement, a short-circuit for the dial impulse springs can be used in conjunction with a dial controlled code responsive unit, the dial mechanism being provided for this purpose with a set of dial controlled contacts which are quite independent of the main dial contacts. In this case the short circuit switch can either be switched in by dialling a first predetermined code and be switched out by dialling a second predetermined code or be switched in by a manually operated switch (which cannot be used to switch out the short circuit) and be switched out by dialling a predetermined code.

The embodiment of FIGS. 3 to 6 is designed so that it can be interfaced with the standard subscriber's telephone handset, in which dialling pulses are generated by the rotation of a finger plate. The design can readily be adapted to interface with handsets using methods other than rotating finger plate techniques, such as card dialling and press button pulse and tone keying techniques. The device does not interrupt, inhibit or in any way restrict incoming calls.

Briefly the circuitry enables the telephone handset to establish outgoing calls in one of three modes. The appropriate mode is selected by the authorised subscriber dialling a predetermined code number, as he would any other number in the exchange repertoire. The three modes of operation are:

INHIBIT

LOCAL

NORMAL

(A) INHIBIT MODE

In this mode the dialling pulse contacts are short-circuited (unless an emergency call is dialled e.g. 999 in the United Kingdom) thereby preventing subsequent dialling to line. The code used for setting Inhibit will be the calling subscriber's own number in order to retain the full flexibility of the telephone exchange number repertoires. Using the subscriber's own number has the slight disadvantage in that when this code is dialled, the digits preceding the last digit of the subscriber's number will have been transmitted to line, thereby actuating the appropriate uniselector bank in the telephone exchange. This bank will be cleared in the normal manner, i.e. by replacement of the handset in the cradle. There are numerous ways of overcoming this slight disadvantage, such as simulating replacement of the handset in the cradle. A second output is available in the circuitry to provide such simulation if required or thought necessary.

(B) LOCAL MODE

The calling subscriber is restricted to making emergency and local calls only, i.e. he/she cannot dial trunk calls, recorded information services or operator services, e.g. those calls which start with the digit zero or digit one for example.

(C) NORMAL MODE

The calling subscriber is able to make any type of outgoing call.

MODE SELECTION

The operating mode is selected by the calling subscriber dialling a number code. The codes, of which there are three, are four digits long in the embodiment to be described but can in practice be any required length. It is expected that they will normally be of the same length as the telephone subscriber's own number. Since these codes are detected and acted upon by the circuit, they cannot be any of the possible subscriber numbers which the caller may wish to dial. The only number that any given subscriber will never wish to dial is his own. This is the basis for the mode selection codes.

The circuit will place the telephone in the Inhibit mode whenever the telephone subscriber's own number is dialled in either of the other modes. It is only possible to enter either the Normal or Local Mode from the Inhibit Mode. This ensures that no potential subscriber numbers are lost in either of these modes, since the only number responded to in the Local and Normal modes is the telephone subscriber's own number. In the Inhibit Mode the only diallable number is the emergency number, e.g. 999. Thus the Local and Normal codes can be any other numbers. The length of these codes will normally be of the same length as the Inhibit code, e.g:

Suppose the telephone number is 905 1244 then the dialling of this number by a calling subscriber in either Normal or Local Modes will cause the Inhibit Mode to be selected.

Suppose then that the Normal code is 131 7496 and the Local code is 394 3535 then the dialing of either of these numbers, once in the Inhibit Mode, will cause the appropriate mode to be selected and the desired outgoing call can be made. Thereafter the circuit will respond only to the Inhibit code.

It will obviously be necessary for each device to have a different Inhibit code, just as the Normal and Local codes will also have to be easily changeable should any code become compromised. There are many possible ways of implementing this facility, one of which is used in this circuit.

OPERATING MODES

(A) INHIBIT

In this mode the circuit is designed to allow only the dial pulses associated with the emergency number (e.g. 999 in the United Kingdom) through to the exchange. Once the circuit has detected that a number other than 999 is being dialled, further dialling is prohibited. The circuit is unable to detect a non nine digit until the dial pulses for that digit have been released to the exchange. To prevent these pulses from unduly affecting the exchange, the circuit could also simulate the replacing of the telephone handset for sufficient time for the exchange to clear the call. The calling subscriber is thus unable in this mode to make any calls other than emergency calls.

The circuit will respond to either of the Normal or Local codes. Once these have been dialled the normal inter call delay must be waited before the next number is dialled. The circuit will prevent the dial pulses from reaching the exchange as they would for any other non 999 number in this mode.

(B) LOCAL

In this mode the calling subscriber is prevented from dialling to line any number whose first digit is used to identify a trunk switching function such as zero (0) or a recorded information service or an operator service such as those starting with one (1). He/she is thus confined to dialling emergency calls and local calls and cannot make calls via an exchange operator. As in the Normal mode the dialling of the Inhibit code will cause immediate switching to the Inhibit mode.

(C) NORMAL

In this mode the telephone responds normally to all dialled numbers except its own. Whenever it detects its own number (the inhibit code) further dialling is immediately inhibited.

Figure 3:
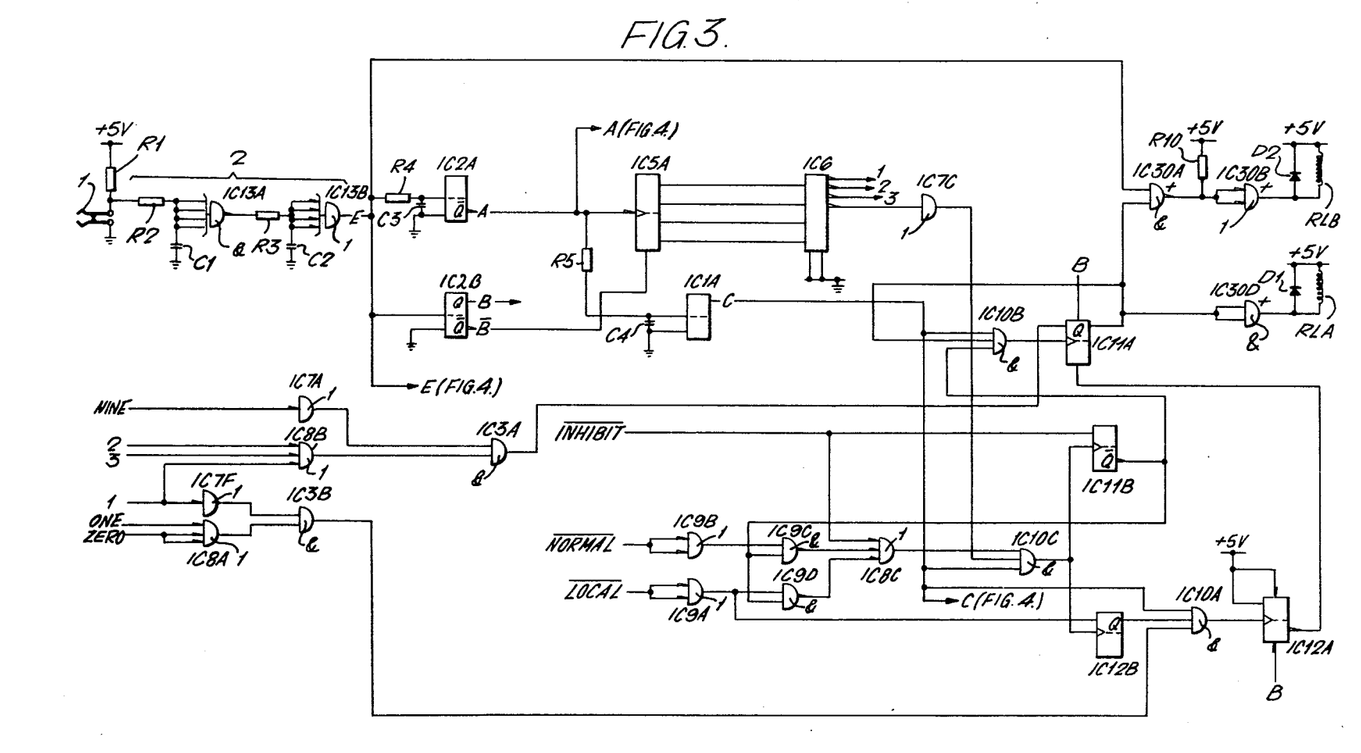
FIG. 3 is a circuit diagram of part of a second embodiment of a security device according to the invention.
Figure 5:
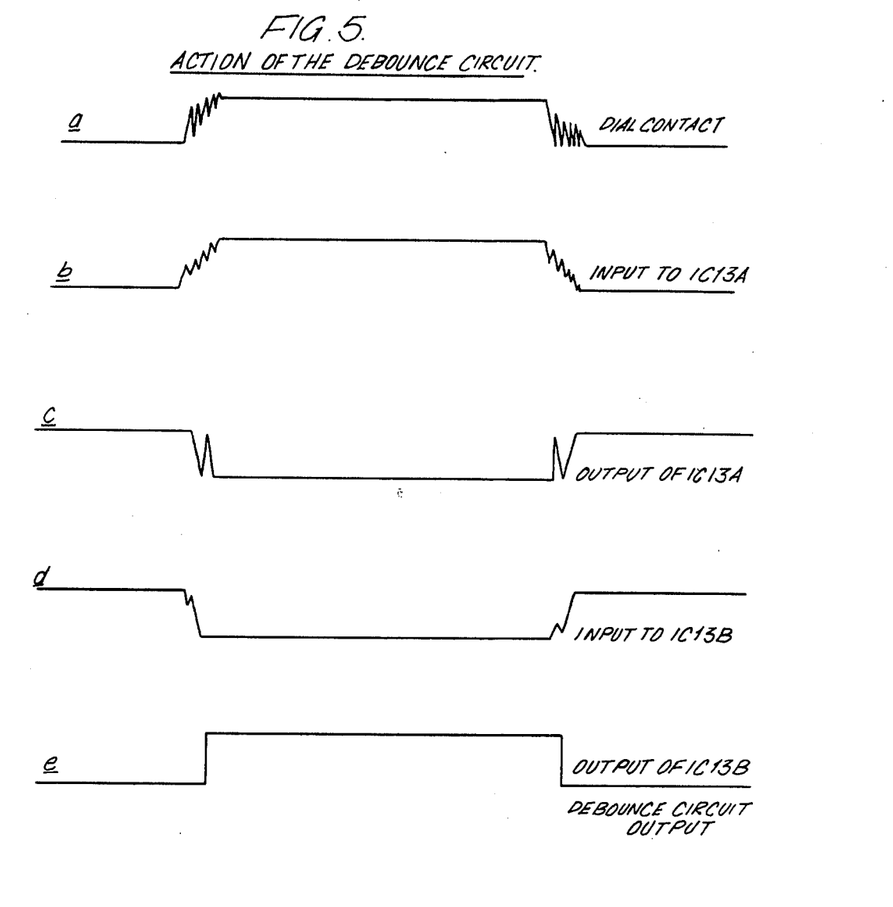

Referring to FIG. 3, the finger plate dial contacts 1 of a telephone subscriber's handset (not otherwise shown) are connected in series with a resistor R1 between ground and a source of +5 volts. The contacts are normally closed and open for each dial pulse. Each time the contacts open, the potential at the point of interconnection between the contacts and the resistor R1 rises from zero to +5 volts thus forming a dialling pulse. Due to the mechanical nature of the contacts 1, opening and closing thereof are often accompanied by "switch bounce" in which the contacts make and break several times as they open or close. The result is spurious signals at each end of the dialling pulse as shown at $a$ in FIG. 5. The spurious signals are cleaned from the dialling pulses by the debounce circuit 2 which comprises a first integrator having a resistor R2 and a capacitor C1 which filter each dialling pulse to form the waveform $b$ in FIG. 5. The output of the first integrator is passed to an active "And" gate IC13A which gives a hysteresis action and forms an output signal such as waveform $c$ in FIG. 5. This signal is further filtered by a second integrator comprising the resistor R3 and the capacitor C2 and the output of this second integrator, waveform $d$ in FIG. 5, is fed to a further active gate having a hysteresis action IC13B of which the corresponding output, $e$ in FIG. 5, is a clean dial pulse E of almost identical length to the pulse formed by the contacts 1.

The dialling pulses E from the debounce circuit 2 are fed by way of a delay network comprising the resistor R4 and the capacitor C3 to trigger a monostable circuit IC2A, which is set to mature after a period of time just longer than the time taken up by a dial pulse plus the period between two adjacent dial pulses. Since each dial pulse retriggers IC2A, it therefore does not mature until after the last pulse of a particular digit being dialled. The normal potential at the output of IC2A has a digital value "1" but falls to "0" when it is triggered and remains so until the circuit has finally matured. Thus the output signal A of IC2A is a zero-going pulse of duration slightly greater than the time occupied by the dialling pulses of each digit.

The delay network R4, C3 is included to delay slightly the triggering of the monostable IC2A. This is necessary in order that a four bit binary counter IC5A, of which the counting input is connected to receive the output signal A from the monostable IC2A, should be correctly operated. The counter IC5A is incremented each time the output signal A of the monostable IC2A goes from high to low, i.e. at the start of each digit when the monostable IC2A is first triggered. Thus, the counter IC5A counts the number of digits dialled in each number and, together with several other devices, must be reset once each number has been completed ready for the next. Such resetting is performed by the inverse output signal $\bar{B}$ from the conjugate output terminal of a monostable circuit IC2B which is triggered by the first dialling pulse of any number being dialled and of which the maturity period is just longer than the maximum time which might reasonably be expected to lapse between the dialling of two adjacent digits of a number being dialled. Thus, since the monostable IC2B is retriggered each time it receives a dialling pulse, it does not mature until after the last digit in the number has been dialled. The signal $\bar{B}$ is thus normally equal to "1" but falls to zero when dialling of a number starts and only rises again shortly after dialling of that number has ended. While the monostable IC2B is in its maturity state, i.e. while the signal $\bar{B}$ is equal to "1" the counter IC5A is maintained in the reset, i.e. zero content, state. Thus, at the start of dialling a new number, the monostable IC2B must be triggered, i.e. so that it stops maintaining counter IC5A in its zero state, before the arrival at the counter IC5A of the first signal from the monostable IC2A. Hence the need for the delay network R4 and C3.

The dialling pulses E from the debounce circuit 2 are also fed to a pulse counter IC5B (FIG. 4) which counts the number of pulses in each digit and converts this number into a four bit binary signal. This signal is then read into the first of a series of four digit registers IC14, 15, 17 and 18. Shortly after the last dialling pulse of any digit, there occurs the rising flank of the signal A, which signal is fed to the clock input of each of the registers IC14, 15, 17 and 18. This rising flank of signal A causes the content of the counter IC5B to be read to the register IC14, the content register IC14 to be transferred to IC15 and so on. The signal A is also fed to the trigger input of a monostable circuit IC1A (FIG. 3) via a delay circuit comprising resistor R5 and capacitor C4 such that, shortly after the occurrence of the rising flank of signal A, IC1A gives out a short duration "end-of-digit" pulse C. This pulse C is fed to the reset input of counter IC5B (FIG. 4) which is thus cleared shortly after its content has been read into the register IC14. As a result, after four digits have been dialled, the register IC18 will contain a binary number corresponding to the first dialled digit, the register IC17 will contain the binary number corresponding to the second dialled digit, the register IC15 will contain the binary number corresponding to the third dialled digit, and the register IC14 will contain the binary number corresponding to the fourth dialled digit.

Figure 4:
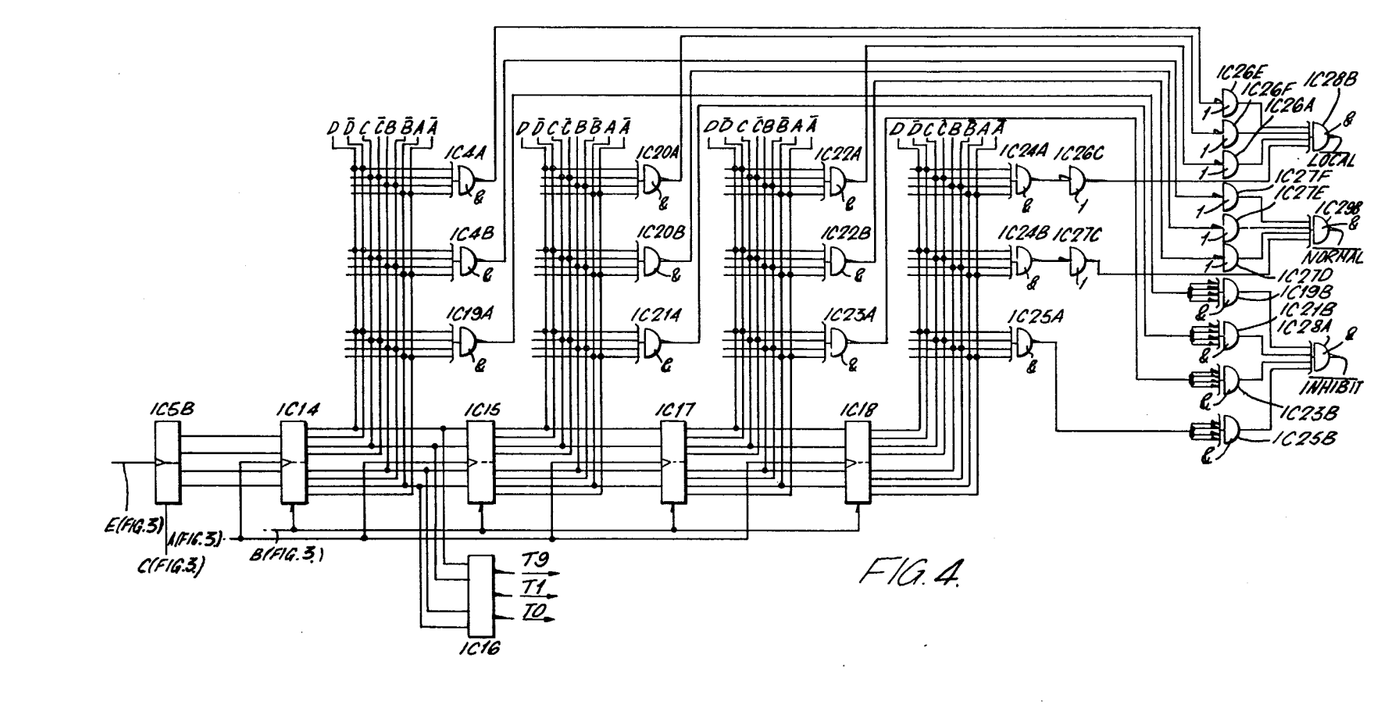
FIG. 4 is a circuit diagram of the remainder of the FIG. 3 embodiment, FIG. 5 (comprised of a-e) is a waveform diagram showing the waveforms of some signals produced in a "debounce" circuit used in the FIG. 3 embodiment.

The mode setting codes are detected by checking the contents of the register IC14, 15, 17 and 18 for preset levels. This is done by means of a series of "And" gates IC4A, IC4B, IC19A, IC20A, IC20B, IC21B, IC22A, IC22B, IC23A, IC24A, IC24B and IC25A. Each of these gates has four inputs connected to four of the eight bit outputs of one of the registers IC14, 15, 17 and 18. Each "And" gate is such that when all of its inputs are high (+5 volts) its output goes low (zero volts). If any of its inputs are low, its output is high. The eight outputs of each register provide respective ones of the true and compliment values of the four bits of the binary number representing the appropriate dialled digit as shown in Table 1.

TABLE 1

| Dialled Digit | Selection Codes | | | | | | | | Decode Connections | | | |
|---|---|---|---|---|---|---|---|---|---|---|---|---|
| | Register Output | | | | | | | | | | | |
| | True | | | | Compliment | | | | | | | |
| | A | B | C | D | $\bar{A}$ | $\bar{B}$ | $\bar{C}$ | $\bar{D}$ | | | | |
| | 0 | 0 | 0 | 0 | 1 | 1 | 1 | 1 | | | | |
| 1 | 0 | 0 | 0 | 1 | 1 | 1 | 1 | 0 | $\bar{A}$ | $\bar{B}$ | $\bar{C}$ | D |
| 2 | 0 | 0 | 1 | 0 | 1 | 1 | 0 | 1 | $\bar{A}$ | $\bar{B}$ | C | $\bar{D}$ |
| 3 | 0 | 0 | 1 | 1 | 1 | 1 | 0 | 0 | $\bar{A}$ | $\bar{B}$ | C | D |
| 4 | 0 | 1 | 0 | 0 | 1 | 0 | 1 | 1 | $\bar{A}$ | B | $\bar{C}$ | $\bar{D}$ |
| 5 | 0 | 1 | 0 | 1 | 1 | 0 | 1 | 0 | $\bar{A}$ | B | $\bar{C}$ | D |
| 6 | 0 | 1 | 1 | 0 | 1 | 0 | 0 | 1 | $\bar{A}$ | B | C | $\bar{D}$ |
| 7 | 0 | 1 | 1 | 1 | 1 | 0 | 0 | 0 | A | B | $\bar{C}$ | $\bar{D}$ |
| 8 | 1 | 0 | 0 | 0 | 0 | 1 | 1 | 1 | A | $\bar{B}$ | $\bar{C}$ | D |
| 9 | 1 | 0 | 0 | 1 | 0 | 1 | 1 | 0 | A | $\bar{B}$ | $\bar{C}$ | D |

TABLE 1-continued

| Dialled Digit | Selection Codes | | | | Decode Connections | | | |
|---|---|---|---|---|---|---|---|---|
| | Register Output | | | | | | | |
| | True | | Compliment | | | | | |
| 0 | 1 0 1 0 | | 0 1 0 1 | | A | $\bar{B}$ | C | $\bar{D}$ |

Thus, by making connections as shown in Table 1 above, and dialled digit can be decoded. These connections can easily be changed to alter any of the codes. Each of the registers IC14, 15, 17 and 18 has three of the "And" gates monitoring its outputs to detect respective ones of the NORMAL, LOCAL and INHIBIT mode codes. The outputs of the NORMAL mode code detecting gates IC4B, IC20B, IC22B and IC24B are fed by way respective inverters IC27F, IC27E, IC27D and IC27C to respective inputs of a four input "And" gate IC28B which thus produces an appropriate NORMAL output signal when all four of the binary numbers in the registers IC14, 15, 17 and 18 are those corresponding to the digits of the selected NORMAL mode selection code. Similarly, the LOCAL mode code detecting gates IC4A, IC20A, IC22A and IC24A are connected by way of respective inverters IC26E, IC26F, IC26A and IC26C to a four input "And" gate IC28B which provides a LOCAL output signal as appropriate. The output of the INHIBIT mode code detecting gates IC19A, IC21A, IC23A and IC25A are connected to all the inputs of respective "And" gates IC19B, IC21B, IC23B and IC25B of which the outputs are connected to respective inputs of an "And" gate IC28A so that this gate provides an appropriate INHIBIT output signal. These three code detection signals, NORMAL, LOCAL and INHIBIT are normally high but become low when the appropriate code is detected.

Also monitoring the outputs of the first digit register IC14 is a decoder IC16 which has a series of output terminals (only three of which are shown because they are the only ones used in the present example) associated with respective values of the coded signal appearing at the inputs of the decoder, and which indicates the value of the code on its inputs by setting the potential of the associated output terminal low, i.e. if the binary number on the input is 7, then output terminal T7 goes low and so on. In the present embodiment, the binary numbers 1, 9 and 0 are to be detected and so connections are made to output terminals T1, T9 and T0.

The digit registers IC14 to IC18 are cleared each time the non-inverse signal B from the monostable IC2B goes low, (at the end of a dialled number).

The content outputs of the digit counter IC5A (FIG. 3) are fed to a decoder IC6 having a series of four outputs. The signal D1, D2, D3 and D4 are normally high but, when the content of digit counter IC5A is one, i.e. just after the first digit has been dialled, the signal D1 falls to zero. When the second digit is dialled and the content of digit counter IC5A becomes two, signal D1 rises again and instead D2 falls to zero. Similarly, after the third digit has been dialled, D3 is zero and, after the fourth digit has been dialled, D4 is zero. The code detector outputs are not used until the fourth digit has been dialled as indicated by decoder IC6, i.e. by the signal D4 falling to zero. The signal D1, D2 and D3 are used in association with the signals from the terminals T0, T1 and T9 of the decoder IC16 (FIG. 4) to detect the dialling of the emergency number 999 when the system is in the INHIBIT mode and to detect attempts to dial a non-local number or the operator when the system is in its LOCAL mode.

When the fourth digit has been dialled and signal D4 falls to zero, if any of the mode codes have been detected, the mode store logic comprising bistable circuits IC11B, IC12B comes into operation. The precise action depends upon the mode the circuit is in already. Each of the bistable circuits IC11B and IC12B comprises a "clock" input K, a set input S, and two conjugate outputs Q and $\bar{Q}$. Only the output $\bar{Q}$ of IC11B and the output Q of IC12B are shown because these are the only ones used. Each of the circuits IC11B and IC12B is such that, when it is "clocked" i.e. when a pulse is received at its clock input K, its output Q takes up the state, high or low, which then exists on its set input S, while its output Q takes up the converse of that state. When in INHIBIT mode, if either the NORMAL or LOCAL code is detected, the two bistable circuits IC11B and IC12B are clocked (their outputs then assume the state specified by their inputs). If the INHIBIT code had been decoded, then IC11B is clocked back into its original state. If the NORMAL or LOCAL codes had been detected, then IC11B assumes the non inhibit state (its output goes low). If NORMAL has been dialled, then IC12B is also left in a non set state, while if LOCAL had been dialled, then it would be set. IC's 11B and 12B thus store the mode of the circuit.

When the circuit is in either NORMAL or LOCAL modes, only the INHIBIT code detection signal is accepted, since the output of the INHIBIT mode store is used to allow the NORMAL and LOCAL signals into gates IC9C and IC9D.

The INHIBIT mode is indicated by IC11B output being high. This output is connected to gate IC10B and enables the other inputs to this gate. These other inputs are respectively connected to receive the "end-of-digit" pulses A from IC1A and the output of IC11A which is a bistable circuit similar to IC11B and IC12B. In between numbers, signal B from IC2B presets IC11A and thus its output is set high ready for the start of the next number. Initially therefore the inputs to IC10B are enabled and it clocks IC11A each time the end-of-digit pulse C occurs. If all of the first three digits are 9's, then each time IC11A is clocked its output remains high enabling the input to gate IC30A and thus allowing it to generate dial pulses. If however, any of the first three digits are not 9, then the input to IC11A from gate IC3A is low and the output of IC11A assumes this stage upon being clocked. When IC11A output goes low, IC30D output goes high, unpowering the relay RLA and opening its contacts. IC11A output also inhibits IC30A and IC10B. Further dial pulses are now inhibited and no further clocking of IC11A is possible. The circuit remains in this state until signal B is generated after dialling ceases, whereupon the output of IC11A is reset high and dialling again enabled.

When in NORMAL or LOCAL modes, the output of IC11B stays low, and by inhibiting IC10B prevents IC11A from being clocked. In NORMAL mode therefore no inhibiting action over occurs (unless the INHIBIT code is dialled). In LOCAL mode IC12B output is high; thus IC10A is enabled. If the first digit dialled is inadmissable as indicated by IC3B output, then when end-of-digit pulse C occurs, IC12A is clocked. The output of IC12A now assumes a low level and forces IC11A into the INHIBIT state preventing dialling, etc., as before. IC12A remains in this state until signal B resets it, so IC11A is held in the INHIBIT state. If the first digit is admissable, IC10A is inhibited and IC12A is not clocked. IC3B is inhibited on all other digits in the number, so IC12A is never clocked after the first digit.

Relay RLB performs the dialling function by replacing the dial contacts. Relay RLA can be used to simulate the replacement of the receiver by connecting its contacts in series with the connections to the exchange. The opening of the relay causes the exchange to clear down the call. Thus the circuit both prevents further dialling and clears down any partially connected number. The use of relays enables isolation to be obtained between the security device and the telephone system.

IMPLEMENTATION

The embodiment shown is implemented in normal power TTL (Transistor Transistor Logic) and thus consumes a considerable amount of power (several hundred milliamps at +5v). Preferably, however, the circuit will be powered from the line voltages available in the telephone line system for which it should preferably have a much lower current consumption. This could be achieved by implementing the device in a similar large or medium scale integrated circuit technology to that of currently available push button dialling chips (etc.)

The push button dialling chips currently available tend only to be powered while the dialling is in progress. The described embodiment of the invention, however, requires that its operating mode be remembered between calls. This means that at least the mode store must remain under power in between calls. A memory of the capacity necessary for this (2 bits) could easily be implemented in a form which would require negligible power to maintain its state. Such a memory could operate for months off the charge stored in a capacitor. Each time the telephone was used the capacitor would be recharged.

Several technologies offer the required characteristics for the mode store memory (zero or negligible power drain) so this should not present a problem.

This embodiment comprises a single pair of contacts for the generation of dial pulses and another pair for further inhibiting action. It may in practice only be necessary to provide the headset replacement relay, the dial contacts being left connected in the telephone circuit. The circuit, however, still requires to sense the contact make/break action. It thus may well be easier to leave the circuit to generate the pulses in order to ease the interfacing problems that would otherwise be encountered.

The embodiment simulates the replacement of the handset by disconnecting the complete telephone from the exchange. This both prevents further dial pulses from reaching the exchange and causes the exchange to clear down the call.

This action differs from the replacement of the handset in that when the handset is replaced, the bell circuit is switched across the lines to the exchange, enabling incoming calls to energise the bell, whereas when the inhibition relay disconnects the telephone, neither incoming nor outgoing calls can be received or made until the circuit resets (about 8 seconds but adjustable to any time, provided it is long enough for the exchange to clear the call). This should not present a problem, since the handset will normally be off the rest during this period, so the bell circuit would be disconnected anyway. If it was desired to totally simulate the replacement of the receiver, a more complex relay would be required.

Figure 6:
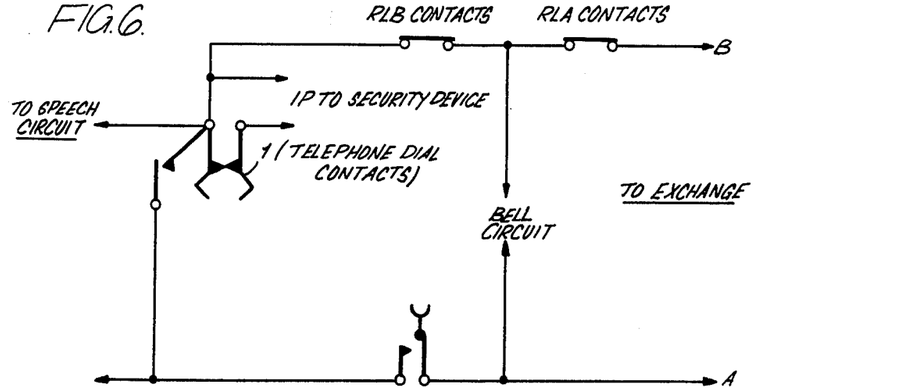
FIG. 6 is a simplified diagram showing how the security device of FIG. 3 may be connected to a subscriber's set.

The manner of connection of the security device into a rotating fingerplate type telephone is shown in FIG. 6.

It will be understood that the code setting method used in the illustrated embodiment can be modified and perhaps made more sophisticated. For example, the number of connections to the code setting points is rather large, particularly on a 7 or 8 digit code device (160 on an 8 digit device). This problem could be overcome by using a scanning technique to compare the register with the set codes. Such techniques are commonly used on calculators, etc., and could reduce the number of connection lines to a more reasonable figure (say 10). The contact debounce techniques could also become similar to those used in calculators.

The illustrated embodiment is designed to operate with the rotating finger plate telephones, and uses the contact breaker built into these dials. There are available several other forms of telephones with correspondingly different dialling techniques. The device as described here could, with the appropriate interface techniques, be used in this form of telephone. If, however, the device were for instance designed into the push button dialling IC, greater advantage could be taken of the characteristics of this type of telephone. In both the push button dialling telephone and the card dialling telephone the number to be dialled is known before the dial pulses are generated (the push button dialler stores the number before dialling it). Thus, if the device were incorporated into these IC's, the call could be inhibited before any dial pulses are generated. This would no doubt offer the most satisfactory method of inhibiting calls.

OTHER OPERATING MODES

Other data is available by which calls can be inhibited if numbers of greater than a preset length are dialled. The circuit counts the number of digits dialled in each number and could therefore inhibit the call if it exceeded the preset length.

The basic device as described here does not have to be positioned in the calling subscriber's telephone handset but could be at any position between the dial contacts and the exchange uniselectors (etc.). The main circuit changes required would be in the interface to the telephone system if its position were to be changed.

Provision is also made for the introduction of timing devices which could clear the calls after a preset time (e.g. 3 minutes) the call length also being entered via the dial (possibly in seconds).

The invention can be implemented by the use of software in computerised or stored programme controlled telephone exchanges.

Circuitry can be provided in each of the described embodiments so as to feed to the speech circuit of the calling subscriber's set a signal which would simulate a suitable tone, for example a number unobtainable or an engaged tone, in the earpiece of the set when the inhibit circuit comes into operation to inhibit an attempted call.

I claim:

1. A telephone security device for preventing unauthorized use of a telephone subscriber's set, the device comprising:
   inhibit means for connection to the called number selecting means of the subscriber's set for at least partly inhibiting the operation of said selecting means;

code signal recognition logic means which has an input for receiving code signals and which is operable for responding to the reception thereby of first and second predetermined multiple-digit numerical code signals to produce corresponding first and second mode output signals, and mode register means which has two stable mode states, which is connected to said code signal recognition means and said inhibit means, and which is operable when it is in one of said two states to respond to the reception from the code signal recognition means of said first mode output signal to enter the other of said two states and to remain in the said other state even following disconnection of a subsequently made telephone call and when it is in said other state to respond to the reception of said second mode output signal from the code signal recognition means to enter said one state, the mode register means being further operable to control said inhibit means so that, for as long as the mode register means is in said one of said two states, the inhibit means prevents any successful attempt to use the said called number selecting means to make outgoing calls to at least some destination telephone numbers and, for as long as the mode register means is in said other state, the inhibit means is inoperative and hence allows any number of outgoing calls to be made normally.

2. A device according to claim 1, wherein the input of said code signal recognition means is connected to said called number selecting means for receiving code signals formed by said selecting means.

3. A device according to claim 1, including keyboard means connected to said input of said code signal recognition means for applying said code signals thereto.

4. A device according to claim 1, wherein said code signal recognition means comprises:

logic means connected to said input for responding to either of said predetermined multiple-digit numerical code signals applied thereto, respectively an INHIBIT MODE code signal and a NORMAL MODE code signal, and for forming in response to the reception of such code signals corresponding INHIBIT MODE and NORMAL MODE output signals, and wherein said mode register means comprises:

a mode store which which has two stable states, which is connected to said logic means and which is operable, when it is in one of said two states, for responding to the reception from the logic means of a NORMAL MODE output signal to enter and remain in said other state and, when it is in said other state, for responding to the reception thereby from the logic means of an INHIBIT MODE output signal to enter and remain in said one state;

digit value and position detector means for being connected to said called number selecting means and operable for detecting the presence of predetermined digit values at predetermined positions in a number being selected by the called number selecting means; and control gate means which is connected to said inhibit means, said mode store and said digit value and position detector means, and which is operable for passing control signals to said inhibit means under the control of the mode store and the digit value and position detector means, the mode register means being operable to register receipt of an INHIBIT MODE output signal from said logic means and to then control said inhibit means so that it inhibits further operation of said called number selecting means as soon as it has been detected by said digit value and position detector means that the value and position of a selected digit is other than in correspondence with a digit of at least one predetermined telephone number such as an emergency service number, and being further operable to register receipt of a NORMAL MODE output signal from said logic means and to then make inoperative said inhibit means.

5. A device according to claim 4, wherein said logic means is further responsive to a third predetermined multiple-digit numerical code signal applied thereto, being a LOCAL MODE code signal, for forming a corresponding LOCAL MODE output signal, and said mode register means is further operable to register receipt of a LOCAL MODE code signal from the logic means and to then control said inhibit means so that it inhibits further operation of said selecting means as soon as it is detected by said digit value and position detector means that the value and position of a selected digit corresponds to a digit which is used for making non-local telephone calls.

6. A device according to claim 5, wherein said mode register means is operable to register receipt of a NORMAL MODE output signal and a LOCAL MODE output signal from the logic means only when it has previously registered an INHIBIT MODE output signal.

7. A device according to claim 4, wherein said logic means comprises:

a series of digit registers for registering the digits of a number selected by said selecting means, a series of "AND" gates, and alterable interconnection means connected between the outputs of the digit registers and the inputs of the "AND" gates for making the "AND" gates responsive to selected combinations of digits registered by the digit registers.

8. A device according to claim 4, further including switch means connected to said control gate means for being operated in association with said inhibit means to clear a telephone exchange line to which the subscriber's set is connected by simulating replacement of the handset of the subscriber's set on its cradle.

9. A device according to claim 1, wherein said code signal recognition means comprises:

code signal generating means for forming an electrical code signal representative of a code applied thereto, store means for storing said first and second predetermined code signals, and comparator means connected to said code signal generating means said store means for comparing code signals received from the code signal generating means with the stored predetermined code signals, and wherein said mode register means comprises:

a bistable control device which is connected to said inhibit means and said comparator means and which has two stable control states in one of which states it is operable to cause the inhibit means to at least partly inhibit the operation of said selecting means and in the other of which states it is operable to cause the inhibit means to cease inhibiting the operation of said selecting means, said comparator means being operable to set the bistable control device to said other state when it detects correspondence between a code signal received from the code signal generating means and said stored first predetermined code signal and said comparator means is operable to reset said bistable control device to said one control state when it detects correspondence between a code signal received from said code signal generating means and said second stored predetermined code signal.

10. A device according to claim 1, wherein said inhibit means, while it at least partly inhibits the operation of said selecting means, nevertheless always enables said selecting means to be used to call at least one predetermined telephone number such as an emergency service number.

* * * * *